Patented Jan. 2, 1940

2,185,243

UNITED STATES PATENT OFFICE 2,185,243

PREPARATION OF N-SUBSTITUTED LUTIDONES

Albert B. Boese, Jr., Pittsburgh, Pa., assignor to Carbide and Carbon Chemicals Corporation, a corporation of New York No Drawing. Application August 13, 1936, Serial No. 95,852

6 Claims. (Cl. 260—295)

This invention relates to the preparation of N-substituted lutidones; and it more especially concerns the production of N-substituted lutidones by reacting diacetyl acetone or dimethyl pyrone and a primary aromatic or aliphatic amine.

According to this invention, a solution of diacetyl acetone or dimethyl pyrone in a solvent for the reactants which is inert thereto is reacted with a primary amine. In instances where the primary amine is water-soluble or water-miscible,—as in the case of aliphatic amines, including the amino derivatives of the cyclo-paraffins,—either diacetyl acetone or dimethyl pyrone may be reacted therewith, and water preferably is employed as the solvent. However, volatile solvents conveniently may be employed in place of water when utilizing diacetyl acetone. Among solvents suitable for use when using water-insoluble amines are the water-insoluble solvents, as benzene, toluene, xylene; the higher-boiling aliphatic hydrocarbons; and chlorinated solvents such as trichlorethylene, carbon tetrachloride, and ethylene dichloride. Where water-soluble amines are reacted, solvents such as acetone, methanol and ethanol may be used.

The process is best conducted by heating under reflux a solution of approximately equimolecular portions of the primary amine and diacetyl acetone or dimethyl pyrone, in a solvent for the reactants which is inert thereto. When a water-insoluble amine is used, diacetyl acetone is employed as the other reactant, in solution in an organic solvent, and preferably one that forms an azeotropic or constant-boiling mixture with water. The water formed during the reaction may be continuously removed by distillation as an azeotropic mixture of water and the solvent.

The reaction, however, may be conducted at temperatures as low as around room temperature, particularly where diacetyl acetone is employed, by dissolving the reactants in water and permitting the solution to evaporate either spontaneously or under vacuum.

As the reaction proceeds, an oil separates from the reaction mixture. Upon cooling the latter, the N-substituted lutidone crystallizes therefrom, and may be recovered and purified in suitable manner, as by recrystallization from a suitable solvent such as methanol.

The N-substituted lutidones thus prepared are tertiary amines that are of interest as intermediates for the preparation of pharmaceuticals. The N-substituted aryl lutidones are also of interest as dyestuff intermediates. Various patents pertaining to pyridone and its derivatives indicate them to be of therapeutic value. It is even possible that the therapeutic value of N-substituted lutidone derivatives might be greater than that of the corresponding pyridone derivatives, due to the presence of the two methyl groups. United States Patent No. 1,941,312 of Miescher and Vrech covers N-substituted derivatives of pyridone having therapeutic values. The value of lutidone derivatives in dyestuff preparation is suggested by the subject matter in the last two paragraphs on page 498 of volume 51 of the Jour. Chem. Soc. (London).

The following equations, wherein R designates either an alkyl, an aryl, an aralkyl, or a substituted alkyl or aryl radical, represent the general character of the reactions involved:

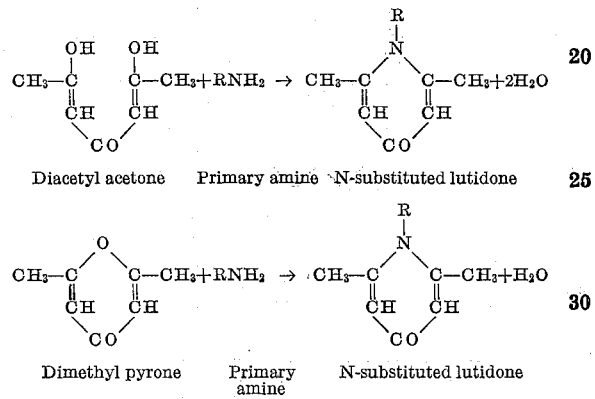

The diacetyl acetone employed in the present invention may be prepared by the hydrolysis of dehydracetic acid in the presence of concentrated hydrochloric acid, followed by the neutralization of the resultant reaction mixture and treatment thereof with an excess of barium hydroxide to precipitate the barium salt, the latter of which then is decomposed with hydrochloric acid in the presence of water, thereby forming a solution of diacetyl acetone. The latter compound is recovered by extracting the solution with chloroform, and drying and distilling the extract in vacuum to remove the solvent. The diacetyl acetone melts at 44° C., and boils at between 80° and 82° C. under 3 mm. of mercury, absolute pressure.

Dimethyl pyrone may be made by boiling dehydracetic acid with concentrated hydrochloric acid, neutralizing the resultant solution after concentrating it, and extracting and recovering the dimethyl pyrone from the neutralized reaction mixture by means of chloroform.

The following examples serve to illustrate the invention; although obviously the latter is not limited by the specific disclosures herein:

EXAMPLE 1

Preparation of N-phenyl lutidone

To a solution of 3.3 grams of aniline in 50 cc. of benzene was added 5 grams of diacetyl acetone, and the solution was refluxed for 2 hours. The benzene then was distilled off at atmospheric pressure, carrying with it the water formed in the reaction in the form of an azeotropic mixture. There remained 7 grams of a yellow crystalline residue. After recrystallization from water, 4.5 grams of N-phenyl lutidone was secured, melting at between 195° and 197° C., corresponding to a yield of around 64.3%, based upon the diacetyl acetone employed.

EXAMPLE 2

Preparation of N-beta-naphthyl lutidone

A solution of 7 grams of diacetyl acetone and 7 grams of beta naphthylamine in 60 cc. of xylene was refluxed under a condenser with a side tube to collect water formed during the reaction. After 25 hours, 1.4 cc. of water were collected, representing 78% of the theoretical amount. The solution then was cooled, and 6 grams of N-beta-naphthyl lutidone crystallized out. After recrystallization from 75% ethanol, (benzene may be used), the N-meta-naphthyl lutidone was recovered as a pale yellow crystalline compound which melted within the range of from 208° to 210° C., and apparently had the structure corresponding to the formula:

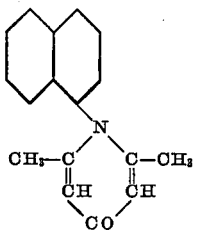

It is soluble in alcohols, ketones, aromatic hydrocarbons, and in dilute mineral acids; but is practically insoluble in chlorinated solvents, aliphatic hydrocarbons, and water.

The following examples illustrate the practice of the invention in the treatment of water-soluble primary amines:

EXAMPLE 3

N-benzyl lutidone

A solution of 1.25 grams of benzylamine and 1.6 grams of diacetyl acetone in 50 cc. of water was heated under reflux for 30 minutes. The oily liquid which separated crystallized upon cooling. The solid was filtered off, air-dried, and was recrystallized from methanol, yielding 1.8 grams of N-benzyl lutidone in the form of colorless needles melting between 121° and 122° C.,—corresponding to a yield of around 75%, based upon the original diacetyl acetone. This compound is soluble in the common organic solvents, but practically insoluble in water; and is completely soluble in dilute mineral acids. It has the apparent structure:

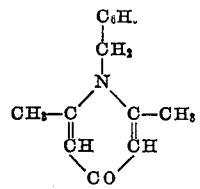

EXAMPLE 4

Upon refluxing for 2 hours a solution of 2 grams of dimethyl pyrone and 1.8 grams of benzylamine in 50 cc. of water, an oil separated which crystallized upon cooling. 2.4 grams of benzyl lutidone, corresponding to a yield of around 70% based upon the original dimethyl pyrone, were recovered in the manner described in Example 3.

EXAMPLE 5

N-hydroxyethyl lutidone

A solution of 22.6 grams of dimethyl pyrone and 11.1 grams of monoethanolamine in 50 cc. of water was evaporated to dryness on a water bath. The dried reaction product was washed with acetone in order to remove unreacted dimethyl pyrone and monoethanolamine. The residual 12.5 grams of crystals, after recrystallization from ethanol, melted between 227° and 229° C., this N-hydroxyethyl lutidone being formed by the interaction of 1 mol of each of the reactants. It has the apparent structure:

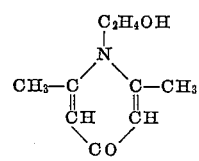

In this example the reactants were employed in substantially equimolecular proportions. By refluxing for 2 hours an aqueous solution containing two equivalents of monoethanolamine and one of dimethyl pyrone, a yield of 60% of the N-hydroxyethyl lutidone was secured, which was recovered in the manner indicated above.

EXAMPLE 6

A solution of 5 grams of diacetyl acetone and 2.15 grams of monoethanolamine in 100 cc. of water was evaporated to dryness on a water bath. The N-hydroxyethyl lutidone in the crystalline residue, after recrystallization from ethanol, melted between 227° and 229° C., and was identical with the compound produced in Example 5.

EXAMPLE 7

N-cyclohexyl lutidone

A solution of 10 grams of dimethyl pyrone and 8 grams of cyclohexylamine in 100 cc. of water was refluxed for 6 hours. An oil separated from the originally clear solution, and crystallized upon cooling of the reaction mixture. The crystalline solid was separated on a filter, air-dried, and recrystallized from methanol. It consisted of 13 grams of N-cyclohexyl lutidone, corresponding to a yield of around 79.8% based on the original dimethyl pyrone; and it occurred as colorless prisms, melting between 139° and 140° C. It is soluble in most of the common organic solvents, such as acetone and the other ketones, ethanol and the other alcohols, esters, and hydrocarbons; is only slightly soluble in hot water; but is completely soluble in dilute mineral acids. The compound has the apparent structure:

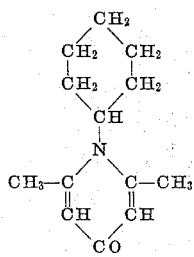

Example 8

N-methyl lutidone

To a solution of 5 grams of diacetyl acetone in 20 cc. of water was added 10 grams of a 33% aqueous solution of methyl amine. The resultant solution was evaporated to dryness on a water bath. The crystalline residue, when recrystallized from water, yielded 4 grams of N-methyl lutidone, which occurred as a colorless crystalline compound melting between 108° and 110° C.

By substituting other primary amines for those specifically named supra, a wide variety of other N-substituted lutidones may be produced. Thus, in place of mono-ethanolamine, monoisopropanolamine may be used, in which case there is formed 2-hydroxy propyl lutidone:

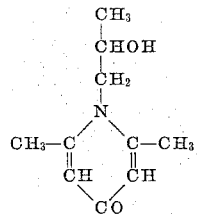

Among other primary amines adapted for use with the invention are o- and m-toluidine, xylidine, α naphthylamine, and the diaminobenzenes, propylamine, etc.

While approximately equimolecular proportions of the reactants preferably are employed, it is possible to depart rather widely from such proportions, within the scope of the invention.

The invention is susceptible of modification within the scope of the appended claims.

I claim:

1. Process for preparing an N-substituted lutidone, which comprises reacting a primary aromatic amine with diacetyl acetone in the presence of a volatile water-insoluble organic solvent which is inert to the reactants.

2. Process for preparing an N-aryl lutidone, which comprises reacting diacetyl acetone with a primary aromatic amine in the presence of an inert water-insoluble solvent for the reactants, removing from the reaction mixture the water formed by the reaction, and separating from the residual solvent the N-aryl lutidone present therein.

3. Process for preparing an N-aryl lutidone, which comprises refluxing diacetyl acetone with a primary aromatic amine having the amino group directly attached to the aromatic nucleus, in the presence of an inert solvent for the reactants which forms an azeotropic mixture with water, and distilling off the water from the reaction zone by the aid of said solvent.

4. Process for preparing an N-substituted lutidone, which comprises reacting a water-insoluble primary amine with diacetyl acetone in the presence of a water-insoluble solvent for the reactants which is inert with respect thereto.

5. Process for preparing an N-substituted lutidone, which comprises reacting diacetyl acetone with a water-insoluble primary amine, in the presence of an inert solvent for the reactants which forms an azeotropic mixture with water, by distilling off the water from the reaction zone by the aid of said solvent.

6. Process for preparing an N-aryl lutidone, which comprises reacting diacetyl acetone with a primary aromatic amine, in the presence of an inert solvent for the reactants which forms an azeotropic mixture with water, and distilling off the water from the reaction zone by the aid of said solvent.

ALBERT B. BOESE, Jr.